(12) United States Patent
Bindra

(10) Patent No.: US 6,294,012 B1
(45) Date of Patent: Sep. 25, 2001

(54) HIGH STRENGTH MONOAZO YELLOW PIGMENT

(75) Inventor: Amrit P. Bindra, Brecksville, OH (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/439,738

(22) Filed: Nov. 15, 1999

(51) Int. Cl.$^7$ .............................. C09B 63/00; C09B 67/22
(52) U.S. Cl. .................. 106/496; 106/31.78; 106/31.79; 106/493; 106/494; 524/106
(58) Field of Search .................................. 106/496, 493, 106/494, 31.78, 31.79; 524/106

(56) References Cited

U.S. PATENT DOCUMENTS

| | | | |
|---|---|---|---|
| 4,167,422 | 9/1979 | Bellanca et al. | 106/289 |
| 4,486,237 | 12/1984 | Paffoni et al. | 106/308 Q |
| 4,594,411 | 6/1986 | Henning | 534/784 |
| 4,628,082 | 12/1986 | Lorenz et al. | 534/707 |
| 4,664,715 | 5/1987 | Jesse | 106/309 |
| 4,810,302 | 3/1989 | Funatsu et al. | 106/402 |
| 4,968,351 | 11/1990 | Ahmed et al. | 106/402 |
| 4,980,458 | 12/1990 | Hari et al. | 534/575 |
| 5,047,517 | 9/1991 | Deucker | 534/784 |
| 5,084,106 | 1/1992 | Kobayashi et al. | 106/402 |
| 5,102,466 | 4/1992 | Mordente et al. | 106/402 |
| 5,457,188 | 10/1995 | Zimmermann | 534/780 |
| 5,669,967 | 9/1997 | Hays | 106/496 |
| 5,733,365 | 3/1998 | Halko et al. | 106/437 |
| 5,744,590 | 4/1998 | Chorlton et al. | 534/780 |
| 5,746,821 | 5/1998 | Hays | 106/496 |
| 5,997,628 | * 12/1999 | Bindra | 106/496 |

FOREIGN PATENT DOCUMENTS

| | | | |
|---|---|---|---|
| 0052069 | 5/1982 | (EP) | C09B/63/00 |
| 0126405 | 11/1984 | (EP) | C09B/29/50 |
| 0225553 | 11/1986 | (EP) . | |
| 0841367A2 | 11/1997 | (EP) | C08K/5/42 |
| 691475 | 5/1953 | (GB) . | |
| 874220 | 8/1961 | (GB) . | |
| 1516223 | 1/1976 | (GB) | C09B/63/00 |
| 62166359 | 7/1987 | (JP) | C03G/9/08 |
| 9964521 | 12/1999 | (WO) | C09B/63/00 |

OTHER PUBLICATIONS

International Search Report (Nov. 13, 2000).

* cited by examiner

*Primary Examiner*—Anthony Green
(74) *Attorney, Agent, or Firm*—Raymond F. Keller

(57) ABSTRACT

Disclosed is a yellow monoazo pigment which is obtained by diazotization of anthranilic acid, coupling of the diazonium compound with 1-(3'-sulfophenyl)-3-methyl-5-pyrazolone and subsequent laking of the coupling product to a strontium salt. The pigment is characterized by the formula:

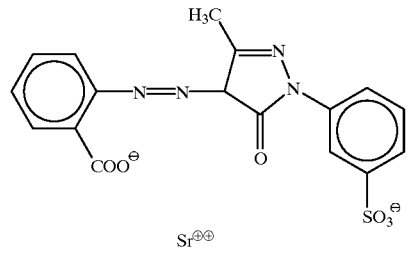

The new pigment has excellent heat stability and bleed fastness and very high color strength. It is suitable for pigmenting of plastics, inks and coatings, and particularly suitable for pigmenting of plastics.

24 Claims, No Drawings

HIGH STRENGTH MONOAZO YELLOW PIGMENT

BACKGROUND OF THE INVENTION

1. Field of the Invention

This invention relates to a novel laked azo pigment, processes for its preparation and to coating, plastic and ink compositions containing the pigment.

2. Description of Related Art

Metal salts of individual azo compounds containing a pyrazolone moiety containing one or two acid groups are known in the art as pigments. Azo yellow pigments are a class of colorants that are tinctorially strong and relatively inexpensive. Monoazo yellow pigments exhibit good lightfastness and are useful as coloring agents for paints and some printing inks. In plastics, however, monoazo yellow pigments tend to undesirably bloom and discolor at high temperatures, so their use is disfavored.

For example, German Patent 2,616,981 describes metal salts of pyrazolone azo dyes which are obtained by coupling diazotized 2-amino-4, 5-dichlorobenzene-1-sulfonic acid with 1-(sulfoaryl)-3-methyl-5-pyrazolone compounds and subsequent laking with metal salts.

Japanese Patent 62,166,359 describes electrophotographic toners that contain monoazo pigments of the formula

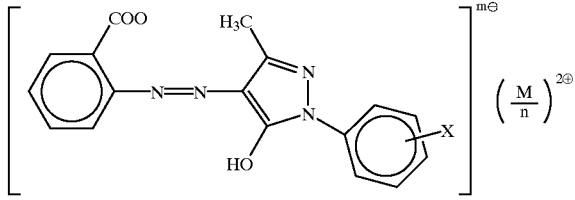

$X=Cl$ or $SO_3^-$; m=1 or 2; M=Mg, Ca or Ba; n=1 or 2. When X is Cl, then m is 1 and n is 2, and when X is $SO_3^-$, then m is 2 and n is 1.

U.S. Pat. No. 4,594,411 describes

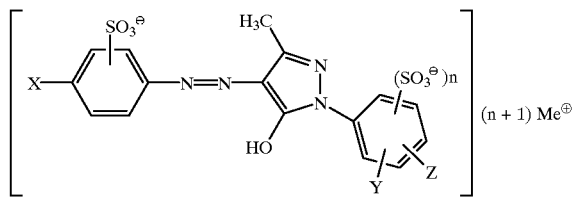

wherein R is $CH_3$ or $COO^-$; X is Cl, $CH_3$, $CH_3O$, $C_2H_5O$ $C_2H_5CONH$, $NH_2CONH$, $C_6H_5CONH$, $CH_3SO_2NH$, $CH_3CONH$, or hydrogen; Y is hydrogen, Cl, or CH3; Z is hydrogen or Cl, n is 0, 1 or 2; $Me^+$is one equivalent of a cation selected from the group consisting of $NH_4^+$, $Li^+$, $K^+$, $Na^+$, ½ $Sr^{2+}$, ½ $Mn^{2+}$, ½ $Ni^{2+}$, ½ $Ba^{2+}$, ½ $Mg^{2+}$ and ½ $Ca^{2+}$; with the provision that if R is $COO^-$, the additional equivalent charge is compensated by a further equivalent of said or another cation.

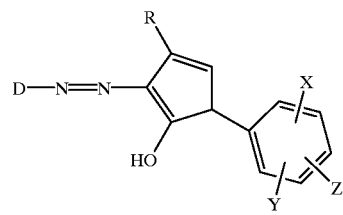

wherein D is tri or tetrasubstituted phenyl ring; R is $CH_3$ or $COO^-$; X is Cl, Br, $CH_3$, $CH_3O$, $C_2H_5O$ $CH_3CONH$, $SO_2NH_2$, $SO_3^-$; Y is Cl, Br, $CH_3$ or $SO_3^-$; Z is Cl, Br or $CH_3$.

U.S. Pat. No. 5,047,517 relates to a yellow monoazo pigment which is obtained by diazotization of 2-amino-4-chloro-5-methylbenzene-1-sulfonic acid, coupling of the diazonium compound with 1-(3'-sulfophenyl)-3-methyl-5-pyrazolone and subsequent laking of the coupling product to the calcium salt.

U.S. Pat. No. 5,669,967 relates to a yellow monoazo pigment which is obtained by diazotization of 2-amino-5-chloro-4-methylbenzene-1-sulfonic acid, coupling of the diazonium compound with 1-(2'-chlorophenyl)-3-methyl-5-pyrazolone and subsequent laking of the coupling product to a divalent metal salt.

There is a desire, however, to obtain migration resistant yellow pigments with high heat stability and ease of preparation as well as reduced cost. There is also a need for these yellow pigments to show improved performance in one or more of the following properties: color strength, resistance to polar solvents and lightfastness.

SUMMARY OF THE INVENTION

This invention relates to an azo pigment suitable for use as coloring agent and processes for its preparation. The yellow azo pigment of the present invention is characterized by having both high color strength and high heat stability. The yellow azo pigment of the present invention is also characterized by having one or more of migration resistance to polar solvents, ease of preparation, low cost of preparation, and lightfastness.

In one embodiment, the present invention relates to a yellow pigment characterized by the formula:

(Formula I)

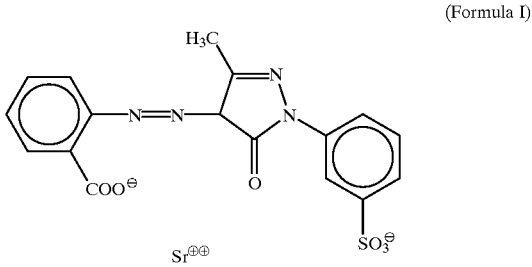

In another embodiment, the present invention relates to a pigment composition containing two or more compounds wherein one of the compounds is represented by the formula:

(Formula I)

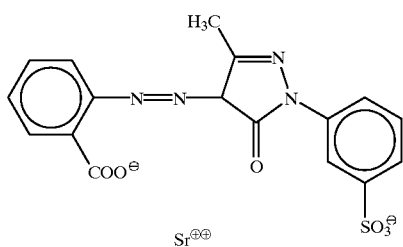

In yet another embodiment, the present invention relates to a process for preparing a yellow pigment composition which involves making an azo dye by coupling (i) a diazonium component comprised of one or more aromatic amines wherein at least one of said amines is anthranilic acid characterized by the formula:

(Formula II)

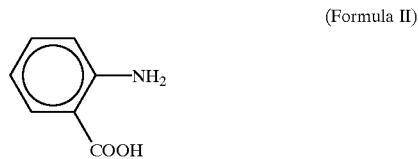

and salts thereof; with (ii) at least one coupling component characterized by the formula:

(Formula III)

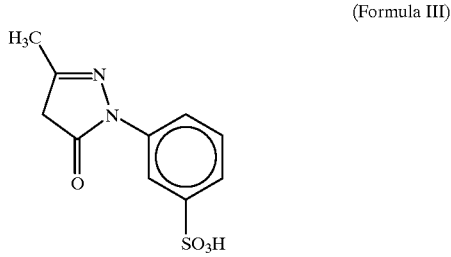

and salts thereof and metallizing said dye with strontium.

In still yet another embodiment, the present invention relates to coating, plastic and ink compositions containing the azo pigment compositions.

DESCRIPTION OF THE PREFERRED EMBODIMENTS

The present invention provides azo pigments and processes for their preparation. The pigments of the present invention may be prepared by initially diazotizing one or more aromatic amines wherein at least one of said amines is anthranilic acid, coupling the diazonium component with 1-(3'-sulfophenyl)-3-methyl-5-pyrazolone coupler to form the desired dye, and laking the coupling product to the strontium salt.

Anthranilic acid or 2-aminobenzoic acid is characterized by the formula:

(Formula II)

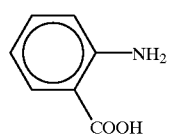

and salts thereof. Examples of preferred salts include ammonium and the alkali metal salts such as the sodium and potassium salts.

In one embodiment, mixtures of two or more aromatic amines, wherein one of the amines is anthranilic acid, are diazotized, then coupled with 1-(3'-sulfophenyl)-3-methyl-5-pyrazolone coupler, and laked to the strontium salt. In this embodiment, aromatic amines that are not anthranilic acid are supplemental aromatic amines. Such supplemental aromatic amines can be useful for shade adjustments of the pigments of the present invention.

A variety of suitable supplemental aromatic amines can be mixed with anthranilic acid for the purposes of the present invention. In one embodiment, the supplemental aromatic amines include primary aromatic amines wherein the aromatic moiety of the amines contains at least one substituent acid group or salts thereof, and preferably the alkali metal or ammonium salts of such supplemental aromatic amines. The aromatic amines may be monoamines or polyamines containing up to about four or more amine groups per molecule. Thus, the diazonium components derived from such supplemental aromatic amines may contain one diazonium group (mono-diazonium), two diazonium groups (bis-diazonium), three diazonium groups (tris-diazonium), etc. The supplemental aromatic aromatic amines may be monocyclic amines such as aniline and its derivatives, or bicyclic amines such as naphthyl amines and their derivatives. The supplemental aromatic aromatic amines may also be biphenylamines or polyamines such as aminobiphenyl, benzidine, and 3, 3', 4, 4'-biphenyltetramine.

In another embodiment, the supplemental aromatic aromatic amine is a primary aromatic amine characterized by the formula (Formula IV)

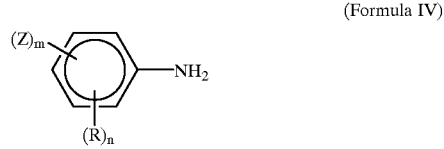

wherein each R is independently a halogen, hydrocarbyl, hydrocarbyloxy, carboxylic acid ester, sulfonic acid ester, carboxylic acid amide, imidazolone, sulfonic acid amide or nitro group; n is 0, 1 or 2; each Z is independently a —COOH or —SO$_3$H group, or salts of such groups; m is 1 or 2; wherein it is understood that the imidazalone group is represented by the formula —NH—C—NH— which, when taken together with the aromatic ring, the nitrogen atoms are bonded to adjacent carbons to form a five member ring, and Formula IV is not anthranilic acid. The term "hydrocarbyl" as used in this specification and claims is intended to include hydrocarbons which may contain heteroatom containing substituent groups such as ether, ester, hydroxy, nitro or halogen which do not materially affect the hydrocarbon character of the group. The hydrocarbyl and hydrocarbyloxy groups typically contain from 1 to about 20 carbon atoms.

In another embodiment, the supplemental aromatic amines characterized by Formula IV contain 0, 1 or 2 R groups which are each independently a halogen, hydrocarbyl, hydrocarbyloxy, carboxylic acid ester, sulfonic acid ester, carboxylic acid amide, imidazolone, sulfonic acid amide or nitro group. The halogen group can be any of the halogens, although chlorine and bromine are generally used, with chlorine being the most preferred example of a halogen substituent. The hydrocarbyl groups may independently be alkyl, cycloalkyl, aryl, aralkyl or alkaryl groups containing from 1 to about 20 carbon atoms. For example, if R is an unsubstituted aryl group, the aromatic amine is a biphenyl amine. When R is an alkyl group, the alkyl group generally will contain from one to about 4 carbon atoms. As used herein, "lower alkyl" shall mean those alkyl groups containing from 1 to about 4 carbon atoms. When R is a hydrocarbyloxy group, the hydrocarbyl moiety may be any of the hydrocarbyl groups discussed above although the hydrocarbyloxy group generally is an alkoxy group containing from 1 to about 4 or more carbon atoms. Preferred R groups are methyl, ethyl and chloro groups.

In yet another embodiment, the supplemental aromatic amines characterized by Formula IV also contain one or two acid groups of —COOH and/or —SO$_3$H, and/or salts thereof. In a preferred embodiment, the aromatic amine of Formula IV contains an —SO$_3$H group.

Examples of supplemental aromatic amines characterized by Formula IV wherein Z is a sulfonic acid group and m is 1 include 2-aminobenzene-1-sulfonic acid, 4-aminobenzene-1-sulfonic acid, 2-amino-5-methylbenzene-1-sulfonic acid, 2-amino-5-methoxybenzene-1-sulfonic acid, 3-amino-6-methylbenzene-1- sulfonic acid, 2-amino-4-chloro-5-methylbenzene-1-sulfonic acid, 2-amino-5-chloro-4-ethylbenzene-1-sulfonic acid, 2-amino-5-chloro-4-methylbenzene-1-sulfonic acid, etc.

Examples of supplemental aromatic amines characterized by Formula IV wherein Z is a carboxylic acid group, and m is 1 include 3-aminobenzoic acid, 4-aminobenzoic acid, 2-amino-5-methylbenzoic acid, 2-amino-6-methylbenzoic acid, 3-amino-2-methylbenzoic acid, 2-amino-3-methoxybenzoic acid, 4-amino-3-methoxybenzoic acid, 4-amino-5-chloro-2-methoxybenzoic acid, 2-amino-4-chlorobenzoic acid, 3-amino-4-chlorobenzoic acid, etc. The benzene sulfonic acid and benzoic acid compounds can be used per se or as their salts. Examples of preferred salts include the alkali metal salts such as the sodium and potassium salts.

In still yet another embodiment, the supplemental aromatic amines are fused cyclic aromatic amine compounds such as compounds derived from naphthalene including 1-sulfo-2-naphthylamines, 4-aminonaphthalene-1-sulfonic acid, etc. Examples of supplemental aromatic amines which are biphenyl amines and polyamines include 4-aminobiphenyl-3'-sulfonic acid, and 4, 4'-diaminobiphenyl-2, 2'-disulfonic acid.

The diazotization of the aromatic amines and supplemental aromatic amines is carried out in any suitable manner, such as those known to those skilled in the art. In one embodiment, the diazotization is carried out through the use of alkali metal nitrites or lower alkyl nitrites together with an adequately strong acid such as a mineral acid. Examples of useful mineral acid include hydrochloric acid and sulfuric acid. Nitrosyl sulfuric acid also can be utilized. In one embodiment, the diazotization reaction is conducted at a temperature from about −20° C. to 40° C. In another embodiment, the diazotization reaction is conducted at a temperature from about 0° C. to about 30° C. In yet another embodiment, the diazotization reaction is conducted at a temperature from about 5° C. to about 20° C.

In one embodiment, a surface-active agent, such as a non-ionic, anionic or cationic surface active agent, is included in the diazotization reaction and/or in the subsequent coupling reaction. Examples of surface active agents include amine oxide surfactants, and specifically cationic amine oxide surfactants, sulfosuccinate surfactants and derivatives thereof and specifically anionic sulfosuccinate surfactants and derivatives thereof.

Amine oxide surfactants include N,N-bis(2-hydroxyethyl)cocoalkylamine oxide, N,N-dimethylcocoalkylamine oxide, dimethyl (hydrogenated tallow) amine oxide, dimethylhexadecylamine oxide, bis(2-hydroxyethyl)tallowamine oxide, coco amidopropyl amine oxide, lauryl (12, 14, 16 blend) dimethyl amine oxide, myristyl dimethyl amine oxide, cocamidopropylamine oxide, and stearyl dimethylamine oxide. Examples include those under the trade designation Aromox available from Akzo Nobel Chemicals and specifically product designations C/12, C/12W, DMC, DMC-W, DMHT, DM16, and T/12; those under the trade designation Barlox® available from Lonza and specifically product designations C, 12 and 14; those under the trade designation DeMox available from DeForest Enterprises and specifically product designations CAPO and LAO; and those under the trade designation Schercamox available from Scher Chemicals and specifically product designation DMS.

Sulfosuccinate surfactants include disodium ethoxylated-alcohol half ester of sulfosuccinic acid, disodium ethoxylated nonylphenol half ester of sulfosuccinic acid, dicyclohexyl ester of sodium sulfosuccinic acid, disodium isodecyl sulfosuccinate, diamyl ester of sodium sulfosuccinic acid, dihexyl ester of sodium sulfosuccinic acid, sodium salt of sulfated nonylphenoxy polyethoxy ethanol, dioctyl ester of sodium sulfosuccinic acid, bis(tridecyl) ester of sodium sulfosuccinic acid, and disodium alkyl sulfosuccinate. Examples include those under the trade designation Aerosol available from Cytec Industries and specifically product designations A-102, A-103, A-196, A-268, AY, MA-801, NPES, OT, TR-70 and 501; those under the trade designation Geropon available from Rhone-Poulenc and specifically product designations SDS, O and 99; and those under the trade designation Mackanate available from The McIntyre Group and specifically product designations DOS-70OM5 and DOS-75.

In another embodiment, the sulfosuccinate surfactant is a sodium dialkylsulfosuccinate surfactant having the molecular formula:

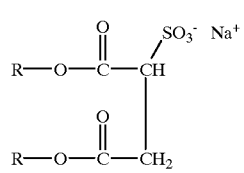

(Formula V)

in which R is an alkyl group having from about 3 to about 20 carbon atoms and preferably from about 4 to about 13 carbon atoms.

In one embodiment, an organic solvent is included in the diazotization reaction and/or in the subsequent coupling reaction. Organic solvents include, for example, one or more of glacial acetic acid, lower alkanols, dioxane, formamide, dimethyl formamide, dimethyl sulfoxide, pyridine and N-methyl pyrrolidone. In another embodiment, an organic solvent is not included in the diazotization reaction and/or in the subsequent coupling reaction.

The 1-(3'-sulfophenyl)-3-methyl-5-pyrazolone coupler is characterized by the formula (Formula III)

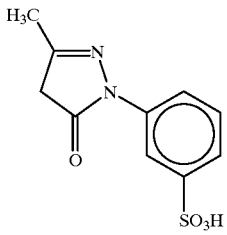

in one embodiment, mixtures of two or more couplers wherein one of the couplers is 1-(3'-sulfophenyl)-3-methyl-5-pyrazolone are within the scope of the present invention. Such secondary couplers are useful for shade adjustments of the pigments of the present invention.

In one embodiment, the secondary pyrazolone couplers useful for the purposes of the present invention are represented by the formula:

(Formula VI)

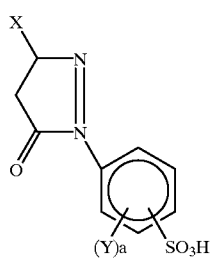

and salts thereof; wherein X is a lower alkyl or a —COOR$_1$ group; wherein R$_1$ is hydrogen or lower alkyl group; each Y is independently a lower alkyl, lower alkyloxy or halogen group; a is 0, 1, 2 or 3. Examples of secondary pyrazolone couplers include 1-(4'-sulfophenyl)-3-methyl-5-pyrazolone and 1-(2'-sulfophenyl)-3-methyl-5-pyrazolone.

In one embodiment, the coupling reaction is effected preferably by adding the diazonium components to coupling components. In another embodiment, the coupling components are added to the diazonium components. Coupling is generally effected at a temperature from about −20° C. to about 80° C. In a preferred embodiment, coupling is conducted at a temperature from about 0° C. to about 65° C. In another preferred embodiment, coupling is conducted at a temperature from about 10° C. to about 50° C. As in the diazotization reaction, coupling is optionally carried out in the presence of a suitable surface active agent and/or organic solvent, such as those identified above for the diazotization reaction.

In one embodiment, the coupling component is dissolved in a basic solution, such as an aqueous alkali metal hydroxide solution, and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component. In one embodiment, the ratio of equivalents of the diazonium component to the coupling component is from about 0.8:1 to about 1.1:1. In another embodiment, the ratio of equivalents of the diazonium component to the coupling component is from about 0.9:1 to about 1:1.

In another embodiment of the present invention, the dispersibility of the pigments of the present invention is improved by adding alkali-soluble resin-like products before, during, or after the coupling is completed or after the metallization discussed below. Various resin-like materials can be added for this purpose, and these include, for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions.

In yet another embodiment, the coupling reaction is performed in the presence of a finely divided insoluble material. Examples of finely divided insoluble materials include alkaline earth metal sulphates and carbonates, titanium dioxide or clay materials or very finely divided organic plastic materials.

The composition prepared by the above-described coupling reaction can be metallized by a suitable divalent metal salt which forms the sulfonate and carbonate salt. This is also known as laking and forms the azo pigment. The metal salt contains strontium, and optionally, strontium and one of alkaline earth metals, manganese, nickel or zinc or mixtures of two or more of these metals. Alkaline earth metals include magnesium, calcium, strontium and barium. Strontium salts are most preferred. Examples of alkaline earth metal salts include the acetate, bromide, carbonate, chloride, fluoride, hydroxide, iodide, nitrate, and sulfate salts of magnesium, calcium, strontium and barium. Alkaline earth metal salts such as $Sr(NO_3)_2$, $SrCl_2$ and $CaCl_2$ are particularly useful for this purpose.

In one embodiment, metallization is accomplished by adding the divalent metal salt to the dye after coupling all of the diazonium component present. In another embodiment, metallization is accomplished by including the metal salt in the diazonium component whereby metallization occurs as the dye is formed.

In one embodiment where supplemental aromatic amines and secondary pyrazolone couplers are not employed, it is preferable that metallization is performed with a strontium salt. In another embodiment where supplemental aromatic amines and/or secondary pyrazolone couplers are employed, it is preferable that metallization is performed with a strontium salt and another divalent metal salt. In yet another embodiment where supplemental aromatic amines and/or secondary pyrazolone couplers are employed, it is preferable that metallization is performed with at least one alkaline earth metal salt. In still yet another embodiment where supplemental aromatic amines and/or secondary pyrazolone couplers are employed, it is preferable that metallization is performed with a strontium salt.

In most applications, it is desirable, in order to maximize the brightness and tinctorial strength, to heat the azo pigment. For example, the product of the metallization may be heated to reflux temperature for about 1 to 3 hours or at temperatures above 100° C. under pressure in the presence of the above-described resin soaps and/or other soluble resins.

After completion of the metallization, the azo pigments are recovered from the water-based reaction slurry by filtering to form a presscake of pigment which is washed with water so as to remove the excess acids, bases and salts that may form in the coupling reaction. The presscake is typically washed with from about 10 to about 20 times its volume of hot water. The filter cake is generally washed until the filtrate gives only a slightly positive test for chloride ion. The washed presscakes can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions.

Examples of pigment compounds that may optionally be present in the pigment compositions of the present invention are those corresponding to the use of supplemental aromatic amines and/or secondary pyrazolone couplers. Such pigment compounds include the following:

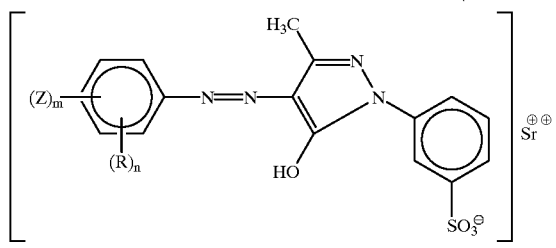

(Formula VII)

wherein each R is independently a halogen, hydrocarbyl, hydrocarbyloxy, carboxylic acid ester, sulfonic acid ester, carboxylic acid amide, sulfonic acid amide or nitro group; n is 0, 1 or 2; each Z is independently a —COOH or —SO$_3$H group, or salts of such groups; and m is 1 or 2, provided that when m is 1 and Z is a —COOH group, n is not 0;

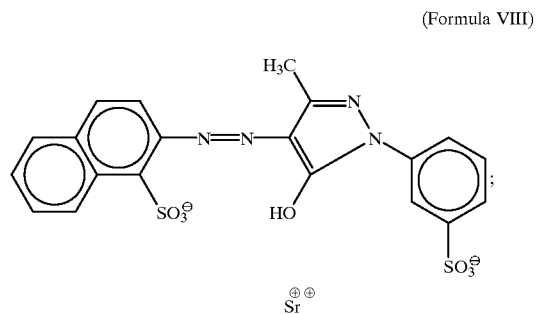

(Formula VIII)

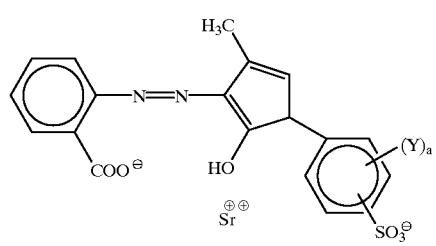

(Formula IX)

wherein X is a lower alkyl or a —COOR$_1$ group; wherein R$_1$ is hydrogen or lower alkyl group; each Y is independently a lower alkyl, lower alkyloxy or halogen group; and a is 0, 1, 2 or 3;

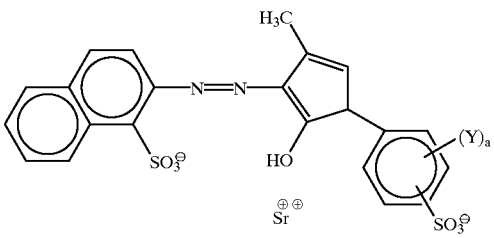

(Formula X)

wherein X is a lower alkyl or a —COOR$_1$ group; wherein R$_1$ is hydrogen or lower alkyl group; each Y is independently a lower alkyl, lower alkyloxy or halogen group; and a is 0, 1, 2 or 3; and

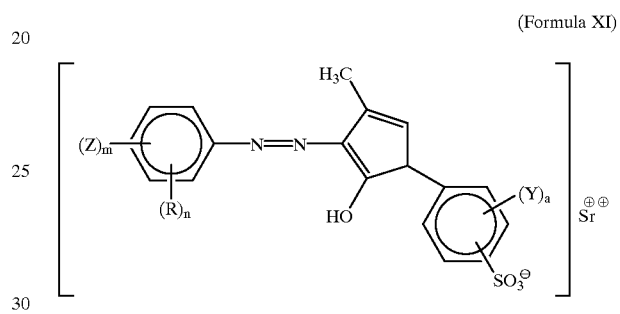

(Formula XI)

wherein X is a lower alkyl or a —COOR$_1$ group; wherein R$_1$ is hydrogen or lower alkyl group; each Y is independently a lower alkyl, lower alkyloxy or halogen group; a is 0, 1, 2 or 3; each R is independently a halogen, hydrocarbyl, hydrocarbyloxy, carboxylic acid ester, sulfonic acid ester, carboxylic acid amide, sulfonic acid amide or nitro group; n is 0, 1 or 2; each Z is independently a —COOH or —SO$_3$H group, or salts of such groups; and m is 1 or 2. In Formulae VII, VIII, IX, X and XI, strontium may be replaced with one or more of manganese, nickel, zinc, magnesium, calcium, and barium.

The pigment compositions of the present invention provide yellow pigments having improved color strength, resistance to polar solvents, light fastness and/or heat stability and are useful as coloring agents in plastics, coatings and inks. In a preferred embodiment, the pigment compositions of the present invention provide yellow pigments having both improved color strength and improved heat stability.

In other embodiments, therefore, the present invention relates to coating compositions including paint compositions, ink compositions and plastic compositions respectively comprising major amounts of a coating vehicle such as a paint vehicle, ink vehicle or plastic and minor amounts of the yellow pigment compositions.

The coating, ink and plastic compositions in which the yellow pigment compositions are useful are well known to those of ordinary skill in the art. Examples of inks include printing inks and lacquers, and plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

The yellow pigment compositions are also useful for pigment printing and for the pigmenting of paper in the mass.

Due to its excellent heat resistance, the pigment is in particular suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters, and mixtures and copolymers thereof.

Examples of coating compositions include paint compositions, adhesive compositions, and powder compositions. Thus, coating compositions include liquid based coating compositions and powder based coating compositions.

See, for example, with regard to ink: R.H. Leach, editor, *The Printing Ink Manual*, Fourth Edition, Van Nostrand Reinhold (International) Co.Ltd., London (1988), particularly pages 282–591; with regard to coatings and paints: C.H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference for their teachings of coating, ink, and plastic compositions, formulations and vehicles in which the pigment compositions of the present invention may be used including amounts of colorants.

The following examples illustrate the compositions of the present invention, methods of their preparation and use. Unless otherwise indicated in the following examples and elsewhere in the specification and claims, all parts and percentages are by weight, temperatures are in degrees centigrade and pressures are at or near atmospheric.

EXAMPLE 1

32 parts of anthranilic acid are dissolved in 300 parts of water and 75 parts of 20 Baume hydrochloric acid. The solution is cooled to 0° C. by the addition of ice and diazotized by the addition of 16.5 parts sodium nitrite in 50 parts of water, followed by stirring the solution at 0–5° C. for 30 minutes. Excess nitrous acid is then quenched by the addition of sulfamic acid. The slurry is chilled to 0° C. by addition of ice and split into four equal parts.

EXAMPLE 1—1

Fifteen and a half parts of 1-(3'-sulfophenyl)-3-methyl-5-pyrazolone are dissolved in 250 parts of water and 2.5 parts of sodium hydroxide containing 1 part of an ester of sulfo succinic acid and the temperature is adjusted to 30° C., the pH is adjusted to 6.5 and the diazonium slurry from Example 1 is then slowly added to it while maintaining the pH at 6 to 7 through addition of sodium hydroxide. The mixture is then stirred for approximately twenty minutes at 35° C. to complete the coupling. Strontium nitrate (16 parts) in 35 parts of water are added. The pH is then adjusted to 5 and the slurry is heated to boil. After boiling for 40 minutes, the slurry is iced to lower than 45° C. and filtered; the filtercake is washed with water, dried overnight at 70° C. and pulverized to give a yellow pigment powder.

COMPARATIVE EXAMPLE 1-1

The procedure of Example 1-1 is repeated except that 16 parts of calcium chloride dihydrate are used in place of strontium nitrate to give a yellow pigment powder.

COMPARATIVE EXAMPLE 1-2

The procedure of Example 1-1 is repeated except that 15.5 parts of 1-(4'-sulfophenyl)-3-methyl-5-pyrazolone are used in place 1-(3'-sulfophenyl)-3-methyl-5-pyrazolone to give a yellow pigment powder.

COMPARATIVE EXAMPLE 1-3

The procedure of Comparative Example 1-1 is repeated except that 16 parts of calcium chloride dihydrate are used in place of strontium nitrate to give a yellow pigment powder.

EXAMPLE 2

Anthranilic acid (4.5 parts) and 2-amino naphthalene-1-sulfonic acid (5.7 parts) are dissolved in 500 parts of water and 28 parts of 20 Baume hydrochloric acid. The solution is cooled to 0° C. by the addition of ice and diazotized by the addition of 4.5 parts sodium nitrite in 14 parts of water followed by stirring the solution at 5–10° C. for 60 minutes. Excess nitrous acid is then quenched by the addition of sulfamic acid. Seven and half parts of strontium nitrate dihydrate dissolved in 18 parts of water are added and the slurry stirred for ten minutes.

Fifteen and a half parts of 1-(3'-sulfophenyl)-3-methyl-5-pyrazolone are dissolved in 250 parts of water and 2.5 parts of sodium hydroxide containing 2 parts of an ester of sulfo succinic acid and the temperature is adjusted to 10° C., the pH is adjusted to 6.5 and the diazonium slurry from the paragraph above is then slowly added to it while maintaining the pH at 6 to 7 through addition of sodium hydroxide. The mixture is then stirred for approximately twenty minutes to complete the coupling. Strontium nitrate (16 parts) in 35 parts of water are added. The pH is then adjusted to 5 and the slurry is heated to boil. After boiling for 60 minutes, the slurry is iced to lower than 45° C. and filtered; the filtercake is washed with water, dried overnight at 70° C. and pulverized to give a yellow pigment powder.

Test Method

A mixture of 0.5 part pigment, 0.5 part titanium dioxide (DuPont Ti-Pure R -960) and 500 parts high density polyethylene (Solvay T50-2000-G) is shaken on a paint shaker to uniformity, then injection molded at 232° C. in a 30 ton Battenfield machine. Spectrophotometric values are measured with a Macbeth Color-Eye (specular component included, large area) to give the chromaticity value, apparent strength (K/S) and hue angle under Illuminant D, 10° C., shown in the Table I.

TABLE I

Results from Test Method

| Pigment | Chrom. | Hue | App. Str. |
|---|---|---|---|
| PV Fast Yellow HGR (P.Y. 191) | 80.6 | 77.5° | 21.7 (Standard) |
| Example 1-1 | 85.8 | 79.5° | 26.7 (23% Strong) |
| Comparative Example 1-1 | 82.3 | 82.1° | 21.1 (3% Weak) |
| Comparative Example 1-2 | 76.2 | 79.9° | 17.2 (21% Weak) |
| Comparative Example 1-3 | 78.3 | 75.2° | 20.8 (4% Weak) |
| Example 2 | 83.4 | 76.2° | 27.2 (25% Strong) |

When incorporated in polyolefins, the pigments obtained according to the present invention display strong, yellow shades in contrast to the weaker yellow shades displayed by Pigment Yellow 191 as well as the pigment obtained by making the calcium salt of the dye formed by coupling diazotized anthranilic acid with a 1-(3'-sulfophenyl)-3-methyl-5-pyrazolone coupler or the pigments obtained by using strontium or calcium salts of the corresponding benzoic acid, 2-[(4,5-dihydro-3-methyl-5-oxo-1-(4-sulfophenyl)-1H-pyrazol-4yl)azo] dye. Pigment Yellow 191 displays a weak yellow color (hue angle 77.5°) of moderate chromaticity value (80.6) and moderate strength (K/S value of 21.7). In contrast the strontium salt of the dye obtained by coupling diazotized anthranilic acid with 1-(3'-sulfophenyl)-3-methyl-5-pyrazolone (Example 1-1) displays a strong, bright yellow color (hue angle 79.5°). The high chromaticity value (85.8) is consistent with the brightness of the color displayed while the high strength is reflected by a high K/S value of 26.7. Unexpectedly the corresponding pigment obtained by using calcium in place of strontium (Comparative Example 1—1) shows relatively weak and dull yellow color (hue angle 82.1°) of moderate chromaticity (82.3) and moderate strength (K/S value of only 21.1). The corresponding pigment obtained by using of 1-(4'-sulfophenyl)-3-methyl-5-pyrazolone in place of of 1-(3'-sulfophenyl)-3-methyl-5-pyrazolone (Comparative Example 1-2) also displays a weak yellow color (hue angle 79.9) of low chromaticity (76.2) and low strength (K/S value of 17.2). The calcium salt of the dye obtained by coupling diazotized anthranilic acid with 1-(4'-sulfophenyl)-3-methyl-5-pyrazolone (Comparative Example 1–3) also displays a weak yellow color (hue angle 75.2) of low chromaticity (78.3) and only moderate strength (K/S value of 20.8). The strontium salt of the dye obtained by diazotizing a mixture of anthranilic acid and 2-aminonaphthalene-1-sulfonic acid and coupling with 1-(3'-sulfophenyl)-3-methyl-5-pyrazolone (Example 2) also displays a strong yellow color (hue angle 76.2) of high chromaticity (83.4) and high strength (K/S value of 27.2).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A yellow pigment represented by the formula:

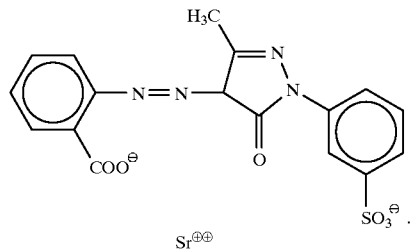

2. A pigment composition comprising two or more compounds wherein one of the compounds is represented by the formula:

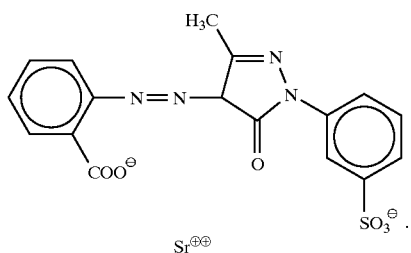

3. A pigment composition according to claim 2, comprising a compound represented by the formula:

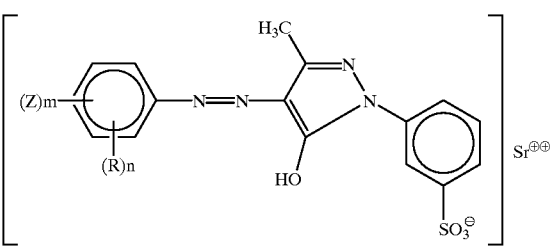

wherein each R is independently a halogen, hydrocarbyl, hydrocarbyloxy, carboxylic acid ester, sulfonic acid ester, carboxylic acid amide, sulfonic acid amide or nitro group; n is 0, 1 or 2; each Z is independently a —COOH or —SO$_3$H group, or salts of the —COOH or —SO$_3$H groups; and m is 1 or 2, provided that when m is 1 and Z is —COOH, n is not 0.

4. A pigment composition according to claim 2, comprising a compound represented by the formula:

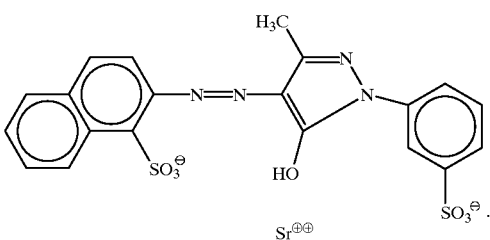

5. A process for preparing a yellow pigment composition which comprises making an azo dye by coupling (i) a diazonium component comprised of one or more aromatic amines wherein at least one of said amines is anthranilic acid represented by the formula:

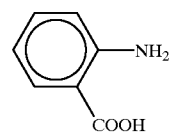

and salts thereof; with (ii) at least one coupling component represented by the formula:

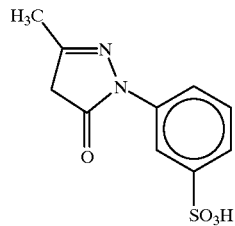

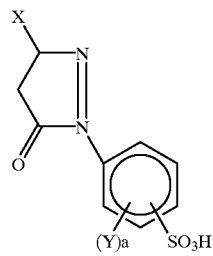

and salts thereof; wherein X is a lower alkyl or a —COOR$_1$ group; wherein R$_1$ is hydrogen or lower alkyl group; each Y is independently a lower alkyl, lower alkyloxy or halogen group; and a is 0, 1, 2 or 3.

and salts thereof and metallizing said dye with strontium.

6. A process for preparing a yellow pigment composition according to claim 5, wherein the diazonium component comprises a compound represented by the formula:

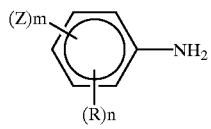

wherein each R is independently a halogen, hydrocarbyl, hydrocarbyloxy, carboxylic acid ester, sulfonic acid ester, carboxylic acid amide, sulfonic acid amide or nitro group; n is 0, 1 or 2; each Z is independently a —COOH or —SO$_3$H group, or salts of the —COOH or —SO$_3$H groups; and m is 1 or 2, provided that when m is 1 and Z is —COOH, n is not 0.

7. A process for preparing a yellow pigment composition according to claim 5, wherein the diazonium component comprises at least one selected from the group consisting of 2-aminobenzene-1-sulfonic acid, 4-aminobenzene-1-sulfonic acid, 2-amino-5-methylbenzene-1-sulfonic acid, 2-amino-5-methoxybenzene-1-sulfonic acid, 3-amino-6-methylbenzene-1-sulfonic acid, 2-amino-4-chloro-5-methylbenzene-1-sulfonic acid, 2-amino-5-chloro-4-ethylbenzene-1-sulfonic acid, 2-amino-5-chloro-4-methylbenzene-1-sulfonic acid, 3-aminobenzoic acid, 4-aminobenzoic acid, 2-amino-5-methylbenzoic acid, 2-amino-6-methylbenzoic acid, 3-amino-2-methylbenzoic acid, 2-amino-3-methoxybenzoic acid, 4-amino-3-methoxybenzoic acid, 4-amino-5-chloro-2-methoxybenzoic acid, 2-amino-4-chlorobenzoic acid, and 3-amino-4-chlorobenzoic acid.

8. A process for preparing a yellow pigment composition according to claim 5, wherein the diazonium component comprises at least one selected from the group consisting of a 1-sulfo-2-naphthylamine, 4-aminonaphthalene-1-sulfonic acid, 4-aminobiphenyl-3'-sulfonic acid, and 4,4'-diaminobiphenyl-2,2'-disulfonic acid.

9. A process for preparing a yellow pigment composition according to claim 5, wherein the coupling component comprises 10. A process for preparing a yellow pigment composition according to claim 5, wherein the coupling is performed with one selected from the group consisting of an amine oxide surfactant and a sulfosuccinate surfactant.

11. A process for preparing a yellow pigment composition according to claim 5, wherein the ratio of equivalents of the diazonium component to the coupling component is from about 0.8:1 to about 1.1:1.

12. A composition prepared according to the process of claim 5.

13. A coating composition comprising a coating vehicle and the yellow pigment of claim 1.

14. A coating composition comprising a coating vehicle and the composition of claim 3.

15. A coating composition according to claim 13, wherein the coating vehicle is a paint vehicle.

16. A coating composition according to claim 14, wherein the coating vehicle is a paint vehicle.

17. A coating composition according to claim 13, wherein the coating vehicle is a powder coating.

18. A coating composition according to claim 14, wherein the coating vehicle is a powder coating.

19. An ink composition comprising an ink vehicle and the yellow pigment of claim 1.

20. An ink composition comprising an ink vehicle and the composition of claim 3.

21. A plastic composition comprising a plastic material and the yellow pigment of claim 1.

22. A plastic composition according to claim 21, wherein the plastic material comprises at least one selected from the group consisting of a polystyrene, a polyolefin, a polyacrylic compound, a polyvinyl compound, a polyester, rubber, a cellulose ether, a cellulose ester, a polyamide, a polyurethane, and a polyacrylonitrile.

23. A plastic composition comprising a plastic material and the composition of claim 3.

24. A plastic composition according to claim 23, wherein the plastic material comprises at least one selected from the group consisting of a polystyrene, a polyolefin, a polyacrylic compound, a polyvinyl compound, a polyester, rubber, a cellulose ether, a cellulose ester, a polyamide, a polyurethane, and a polyacrylonitrile.

* * * * *